(12) United States Patent
Takahashi

(10) Patent No.: US 6,754,018 B2
(45) Date of Patent: *Jun. 22, 2004

(54) MAGNETIC DISC DEVICE AND ERROR CORRECTION METHOD THEREFOR

(75) Inventor: Tsuyoshi Takahashi, Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,914

(22) Filed: Jul. 8, 1998

(65) Prior Publication Data

US 2002/0008928 A1 Jan. 24, 2002

(30) Foreign Application Priority Data

Dec. 25, 1997 (JP) .............................. 9-357512

(51) Int. Cl.[7] .............................. G11B 5/09; G11B 5/02
(52) U.S. Cl. .............................. 360/53; 360/25; 360/46
(58) Field of Search .............................. 360/46, 53, 31, 360/51, 25

(56) References Cited

U.S. PATENT DOCUMENTS

| | | | |
|---|---|---|---|
| 5,233,482 A | 8/1993 | Galbraith et al. | |
| 5,267,241 A | 11/1993 | Kowal | |
| 5,280,488 A | 1/1994 | Glover et al. | |
| 5,856,983 A | 1/1999 | Okazaki | 360/67 |
| 6,049,763 A | * 4/2000 | Christiansen et al. | 360/46 |
| 6,125,469 A | * 9/2000 | Zook et al. | 714/769 |

FOREIGN PATENT DOCUMENTS

| | | |
|---|---|---|
| DE | 19706212 A1 | 12/1997 |
| EP | 0749123 A3 | 12/1996 |
| EP | 0783168 A2 | 7/1997 |
| JP | 61-201173 | 9/1986 |
| JP | 2-31181 | 2/1990 |
| JP | 4-38681 | 2/1992 |
| JP | 7-230388 | 8/1995 |
| JP | 10011709 | 1/1998 |
| WO | WO9700559 | 1/1997 |
| WO | WO9816918 | 4/1998 |

* cited by examiner

*Primary Examiner*—David Hudspeth
*Assistant Examiner*—Dan I. Davidson
(74) *Attorney, Agent, or Firm*—Greer, Burns & Crain, Ltd.

(57) ABSTRACT

A method of correcting erroneous data due to thermal asperity and a device therefor is provided. A magnetic disc device equipped with such error correction device is also provided. The correction device includes a comparator for comparing data signal reproduced from a magnetic disc with a predetermined threshold signal; and circuitry for generating an error signal based on the signal output from the comparator and the data signal. Using the error signal, the location and the length of erroneous data included in the data signal are determined. The erroneous data may be corrected, irrespective of the length thereof, by selective use of hardware ECC on the fly and software ECC. An alternative error signal may be generated by a technique based on the run lengths of the data.

14 Claims, 9 Drawing Sheets

MAGNETIC DISC DEVICE AND ERROR CORRECTION METHOD THEREFOR

FIELD OF THE INVENTION

The invention relates to a magnetic disc device for use as an auxiliary storage or memory means for computers and to a method of correcting erroneous data pertinent to such disc device.

BACKGROUND OF THE INVENTION

Automated electronic apparatuses including personal computers (PC) and office computers have been down sized and functionally enhanced very quickly supported by a recent progress in technology, which has in turn prompted development of compact yet fast and large-capacity memory devices or file systems such as a 5.2 inch, 3.5 inch, and 2.5 inch hard disc drives.

An effort has been paid to improve the density of data recorded on a magnetic disc and to increase the rotational speed of the spindle of the magnetic disc, to thereby improve the data transfer rate to and from a magnetic disc device. It is known that the level of the data which is reproduced or read from the magnetic disc by a magnetoresistive (MR) head does not depend on the linear speed or the rotational speed of the disc, so that the MR head can maintain a high signal level while reading data. Therefore, the MR head has become increasingly more important in this field.

It should be noted, however, that the MR head is maintained afloat while it is reading data only 30–50 nm above the magnetic medium due to a negative pressure acting on the MR head. Prior to read operation, the magnetic disc is at rest on the surface of the magnetic disc, which is also at rest. If the magnetic disc has a very flat surface like a mirror, the head would stick to the surface of the disc and would remain captured by the magnetic disc even after the magnetic disc had started its rotation. In order to prevent such capture, the magnetic disc is provided on the surface thereof with minute protrusions formed by an appropriate surface roughening or texturing technique.

However, such roughening process can form a small number of unexpectedly large protrusions on some tracks on the magnetic disc. The magnetic head will then bump on such large protrusions every time the head passes over the tracks. Collisions of the head with the magnetic disc can also take place when the magnetic disc is heated during read/write operations and the surface of the disc gets deformed, or when the head is thermally deformed, or when the entire magnetic device is subjected to a strong mechanical shock during the operations.

When such a collision takes place, the MR head is temporarily heated for a few microseconds. The resistance of the heated MR head is changed accordingly.

During a read operation the MR head undergoes a relative motion over the magnetic disc while passing a constant electric current through the magnetoresistive element thereof. The magnetoresistive element changes its resistance if a magnetic field externally applied thereto is changed. Hence, the MR head can read magnetically recorded information on the disc in the form of the voltage change across the magnetoresistive element by detecting the change in resistance of the magnetoresistive element. Therefore, if the head collides with a bump or protrusion formed on the disc, the head is temporarily heated and its resistance is changed. This results in a corresponding change in voltage and errors in the information reproduced (i.e. read) from the magnetic disc. Such transient voltage change (which lasts for a few microseconds) can result in erroneous data as much as several tens of bytes.

When such a transient thermal event as mentioned above occurs, there will be a transient waveform or a DC bias in the output of the head, which smears the data read from the disc, and makes the data unrecoverable in a subsequent decoding stage, thereby resulting in unrecoverable read errors. This type of errors observed in MR heads is called TA or thermal asperity.

A strategy well known in the art to avoid thermal asperity is to use a high pass filter (HPF) in a data decoding circuit to cut off low-frequency components of the signal reproduced so as to suppress generation of a transient waveform and promote quick convergence of the disturbed signal. An alternative approach known in the art to hold the reproduced signal is to provide either an automatic gain control (AGC) circuit which causes the data decoding circuit to hold the amplitude of the reproduced signal for a moment or a phase locked loop (PLL) circuit which temporarily prohibits the reproduced signal to follow the DC bias and become out of phase with a clock.

A further technique is known to deal with errors that cannot be corrected by the circuits as mentioned above, which is adapted to recover correct data by means of a circuit, called ECC circuit, provided in the decoding circuit for executing so-called error correction codes (ECC) on the fly.

However, most recent magnetic disc devices have much higher data transfer rates than conventional ones that the amount of data that will be lost due to thermal asperity if it occurs often exceeds the data length that can be corrected by the ECC circuit.

For example, the data length correctable by an ECC circuit is estimated to be at most about 9 bytes for an average magnetic disc device, and at most 20 bytes for a most advanced magnetic disc device. The duration of a thermal asperity is of order of a few microseconds, which corresponds to a loss of data of about several tens bytes, which exceeds the error correction ability of the today's ECC circuit, and hence the ECC circuit cannot deal with such errors.

SUMMARY OF THE INVENTION

It is, therefore, an object of the invention to provide an erroneous data correction device which may determine the location and the length of errors in the data reproduced or read from a magnetic recording medium.

It is another object of the invention to provide a method which may determine the location and the length of errors in the data read from a magnetic recording medium.

It is a further object of the invention to provide a magnetic disc device including an MR head having an MR element for reading data from the magnetic recording disc, the magnetic disc device equipped with means for detecting read errors introduced in the data by a sudden change in electric resistance of the MR element caused by a short collision of the MR head with the magnetic recording disc.

It is a still further object of the invention to provide a magnetic disc device which is equipped, in addition to means for detecting read errors mentioned above, with data recovery means for recovering the data lost by the errors.

It is a still further object of the invention to provide a method for detecting erroneous data involved in the foregoing magnetic disc device.

It is a still further object of the invention to provide a method for detecting and correcting erroneous data involved in the foregoing magnetic disc device.

In accordance with one aspect of the invention there is provide an erroneous data correction device, comprising:

a comparator which compares a first signal indicative of data read from a magnetic recording medium (referred to as data or data signal) and input thereto with a second signal having a predetermined threshold level (referred to as threshold signal) input thereto, for generates an output when the level of the data signal exceeds the threshold signal; and an error signal generation circuit for generating an error signal using the output of the comparator and the data signal.

This error signal generation circuit device may include means for determining the location of erroneous data included in the data signal, using the error signal.

The erroneous data includes a transient waveform generated mainly by thermal asperity.

In the erroneous data correction device, the error signal generation circuit is adapted to select either one of the output of the comparator circuit, the data signal obtained from the magnetic recording medium, or a logical sum of the data signal and the comparator output, and outputs the selected signal as the error signal.

The erroneous data correction device may further include a counter circuit which has input ends for receiving the error signal and a read clock signal. The counter counts up read clock from the beginning of the data. The location of an erroneous data in the data may be obtained from the count up to the occurrence of an error signal. In addition, the erroneous data correction device may further include a register circuit connected with the counter circuit.

The erroneous data correction device may determine the length of the erroneous data included in the data based on the error signal.

The erroneous data correction device may have a further counter which receives the error signal from the error signal generation circuit and a read clock signal from a clock and counts the read clock over the period that the error signal is generated. Thus, the length of the erroneous data may be determined from the count.

An alternative error signal may be generated by another means of the invention which includes a data reproduction circuit for reproducing data read from the magnetic recording disc; and a decoder for use in the data reproduction circuit for performing a data format transformation on the bits of the reproduced data in accordance with a given set of run length rules to generate an error signal.

In this case the decoder may employ zero run-length rules in the form of 8/9 (0, n/m) data format.

In accordance with another aspect of the invention, there is provide an data error correction device, comprising:

a comparator which compares a first signal indicative of data read from a magnetic recording medium (data signal) and input thereto with a second signal having a predetermined threshold level (threshold signal) input thereto, for generating an output when the level of the data signal exceeds the level of the threshold signal; and an error signal generation circuit for generating a first error signal using the output of said comparator and said data signal;

a decoder for use in the data reproduction circuit for performing a data format transformation on the bits of the reproduced data;

means for generating a second error signal based on the run-length rules imposed on said reproduced data; and means for selecting either one of the first and the second error signals.

A magnetic disc device may include any of the erroneous data correction devices as described above.

In a still further aspect of the invention, there is provided a magnetic disc device, comprising:

a decoding circuit for decoding signals using partial response maximum likelihood technique;

a comparator for generating an output signal when the level of the data signal reproduced from the magnetic disc exceeds a predetermined threshold level;

means for determining the location and the length of erroneous data included in the data decoded by the decoder using the output of the comparator and decoded data;

hardware means for executing hardware ECC on-the-fly on the erroneous data; and software means for executing software ECC on the erroneous data; and means for choosing the hardware ECC correction means when the length of the erroneous data is longer than the length correctable by the hardware means, but otherwise choosing the software means.

In a still further aspect of the invention, there is provided a magnetic disc device, comprising:

a decoding circuit for decoding signals using partial response maximum likelihood technique;

a decoder for use in the data reproduction circuit for performing a data format transformation on the bits of the reproduced data;

means for generating an error signal based on the run-length rules imposed on said reproduced data;

means for determining the location and the length of the erroneous data based on the error signal output from the error signal generation means and the data decoded by the decoding circuit using partial response maximum likelihood technique;

hardware means for executing hardware ECC on-the-fly on the erroneous data; and software means for executing software ECC on the erroneous data; and means for choosing the hardware ECC correction means when the length of the erroneous data is longer than the length correctable by the hardware means, but otherwise choosing the software means.

In a still further aspect of the invention, there is provided an error correction method comprising steps of:

comparing a data signal reproduced from a magnetic disc with a predetermined threshold signal to generate an output signal when the level of the data signal exceeds the level of the threshold signal;

generating an error signal associated with the erroneous data included in the data signal based on the output signal and the data signal; and determining the location and the length of the erroneous data based on the error signal.

In a still further aspect of the invention, there is provided an error correction method of the invention, comprising steps of:

determining the location and the length of erroneous data included in data signal reproduced from a magnetic disc;

determining whether said erroneous data has a length correctable by ECC on the fly;

executing ECC on the fly on the erroneous data when ECC on the fly is applicable; and otherwise executing software ECC on the erroneous data.

BRIEF DESCRIPTION OF THE DRAWINGS

FIGS. 3A–D show formats of data recorded on the magnetic disc and a timing chart for signals appearing at various nodes of the data reproducing circuitry of FIG. 1, in which: FIG. 3A is a format of data on the magnetic disc 24; FIG. 3B a reproduced NRZ data, FIG. 3C a read clock RCLK, and FIG. 3D a read gate signal RG.

FIG. 5 shows waveforms relevant in the detection and correction of the erroneous data caused by thermal asperity (TA), in which.

DETAILED DESCRIPTION OF THE INVENTION

An error correction method for correcting errors in data which is reproduced from a magnetic disc device and an apparatus therefor embodying the invention will now be described by way of example with reference to accompanying drawings, in which like reference numerals indicates like components throughout the drawings.

[Structure of the Magnetic Disc Device]

Figure 1:
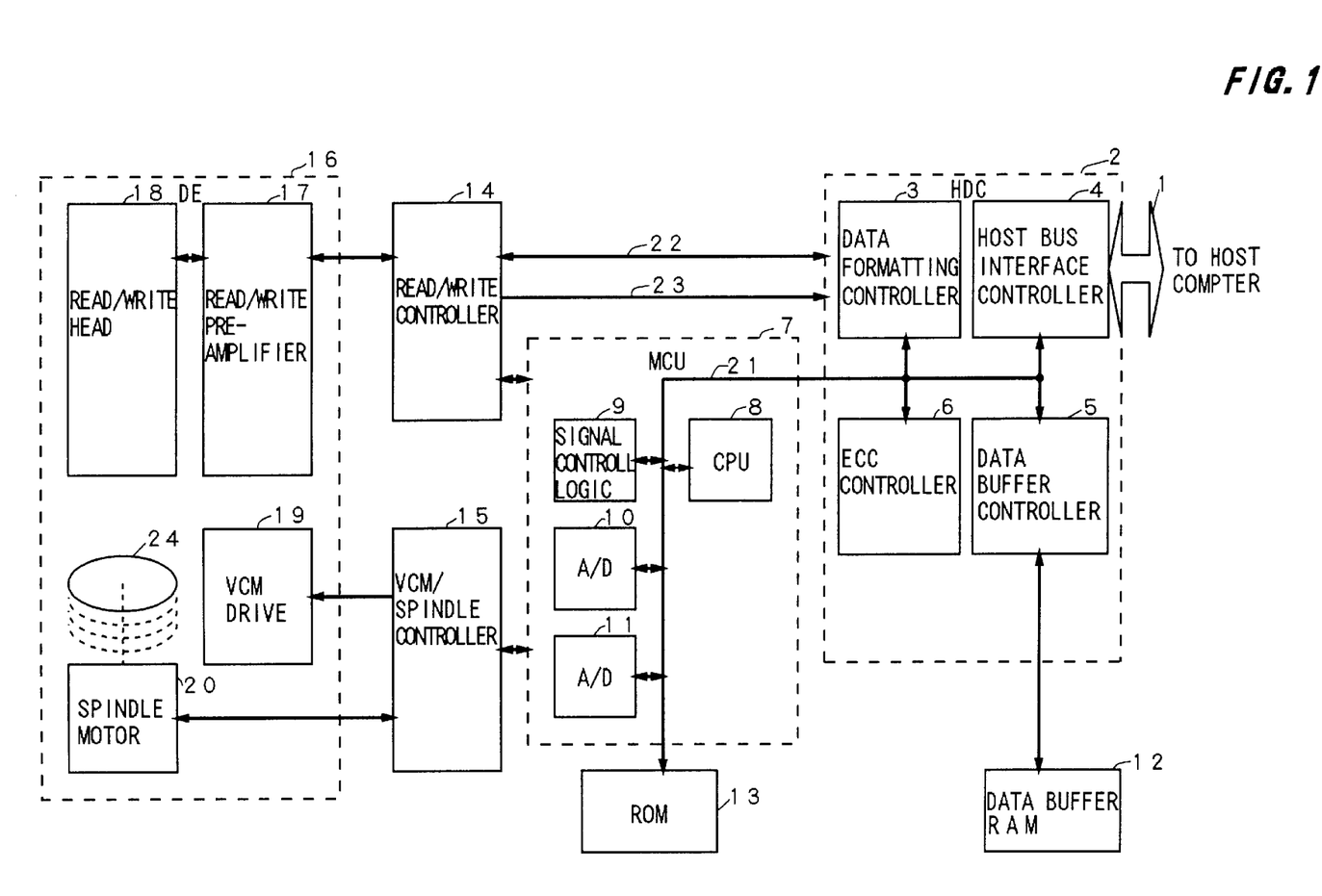
FIG. 1 is a block diagram representation of a magnetic disc device according to the invention.

FIG. 1 shows in block diagram of an overall arrangement of a magnetic disc device according to the invention. The disc device shown herein is of type normally referred to as 3.5 inch hard disc drive, which is used as a server peripheral or auxiliary storage or memory for a personal computer (PC).

The magnetic disc device as shown in block diagram comprises:

a hard disc controller (HDC) 2 connected with a host computer (not shown) via an interface 1, for controlling a hard disc 24;

a micro controller unit (MCU) 7 for controlling mechanical motions of the magnetic disc device in performing read from/write operations to the magnetic disc 24; and a disc enclosure (DE) 16 including in a closed casing thereof a magnetic disc 24 and a built-in read/write head 18. The disc enclosure 16 has connections for exchange of data with the hard disc controller 2 via read/write controller 14 and with MCU 7 via a VCM (voice coil motor)/spindle controller 15. All these components other than the disc enclosure 16 are each made up of a few LSIs mounted on a printed circuit board. In order to keep the components in a clean condition, the entire device is encased in a housing having a dust removing mechanism.

The data stored in the magnetic disc device may be transferred between the host computer (not shown) and the hard disc controller 2 by means of the 16-bit bus interface 1, which data is transformed into an 8 bit NRZ bus signal 22, which is further transformed by the read/write controller 14 into a 9-bit data which is appropriate for recording on the magnetic disc 24. The interface 1 may be a well known SCSI (Small Computer System Interface).

Each of the components shown in FIG. 1 will now be described below.

The hard disc controller (HDC) 2 has a data format controller 3, a host bus interface controller 4, and a data buffer controller 5, and an ECC controller 6.

The data formatting controller 3 receives data from the host computer (not shown) via the interface 1 and encodes the data in a form suitable to be recorded on magnetic disc 24. It also decodes the data read from the magnetic disc 24 into a form suitable for transferring it to the host computer via the interface 1. Although not shown in the FIG. 1, the data formatting controller 3 has a counter circuit 45 and a register circuit 46 which will be described shortly in connection with FIG. 3.

The host bus interface controller 4 controls the interface between the host computer and the magnetic disc device.

The data buffer controller 5 is connected with a RAM (random Access memory) 12 serving as a data buffer for temporarily storing the data sent from the magnetic disc 24 to the hard disc controller 2 before it is transferred to the host computer via the interface 1 at a proper time, or temporarily stores data received from the host computer via the interface 1 and directed to the hard disc controller 2 before it is sent to the disc enclosure 16 at an appropriate time later.

The ECC controller 6 is a conventional hardware error correction circuit, which is capable of correcting errors of at most 9–12 bytes (a newer type of advanced correction circuits can deal with much greater errors as much as 20 bytes). Therefore, magnetic disc devices using such error correction circuits cannot deal with errors that exceed 20 bytes.

In the error correction procedure carried out in the ECC controller 6, data generally are read in sequence from a magnetic disc and the errors found in the data are corrected on the fly by a hardware means. It is said that in such on-the-fly-error correction means if the total length of the data obtained in one read is "2X bytes", the maximum error length correctable or the correction ability of the circuit is "X bytes", so that errors that exceed "X bytes" in length cannot be corrected on the fly by the hardware means.

There is also a software correction means, called "software ECC", which corrects errors by storing all the data of length "2X bytes" read from the magnetic disc 24 once in a RAM (not shown) and then performing error correction operation on the entire data using a software. The correction ability of the software ECC is 2X bytes.

Such software ECC can be advantageously performed if the location of the error (i.e. the number of the sectors up to the error in reference to the beginning of the data) and the length of the error(s) itself are known. However, during the ECC correction by the software, the hard disc must be idling (not usable) and withhold read operations, which can cause an overhead.

The microcontroller unit (MCU) 7 includes a signal control logic 9, a DC converter 10, an A/D converter 11, and a CPU 8 for controlling the entire magnetic disc device, all mounted on one LSI chip.

The CPU 8 also controls such components as the entire magnetic disc device a VCM drive 19 via the VCM/spindle controller 15, a spindle motor 20, as well as a multi-task operation and data correction operation as will be described in connection with FIG. 4. The CPU 8 is connected with a ROM (read only memory) 13 which stores a program for the CPU. The signal control logic 9 is provided to handle logical operations for the CPU 8.

The disc enclosure (DE) 16 has a base and a cover (not shown) for housing therein the magnetic disc 24 for magnetically recording information, a read/write head 18 for reading/writing information from/to the magnetic disc 24, a read/write pre-amplifier 17 for properly amplifying the signal exchanged between the disc 24 and the head 18 to a predetermined level, the spindle motor 20 for rotating a spindle on which the magnetic disc 24 is mounted, and a voice coil motor (VCM) 19 for positioning at a desired position (cylinder) on the magnetic disc 24 the head 18.

The magnetic disc 24 in the example shown herein includes 10 aluminum alloy discs each having thin magnetic layers formed on the opposite sides thereof and may store information up to 18 GB (giga-bytes). The read/write head 18 is a composite head which consists of a magnetoresistive (MR) head for read and an induction head for write. The pre-amplification stage 17 may amplify signals read by the read/write head 18 to a predetermined level. The spindle motor 20 is a DC brushless motor, which has a long life. The voice coil motor (VCM) 19 has a low inertial moment and a high torque characteristic so that it may quickly move the read/write head 18 to a desired position of the magnetic disc 24.

[Circuit Blocks for Generating Error Signal for TA]

Figure 2:
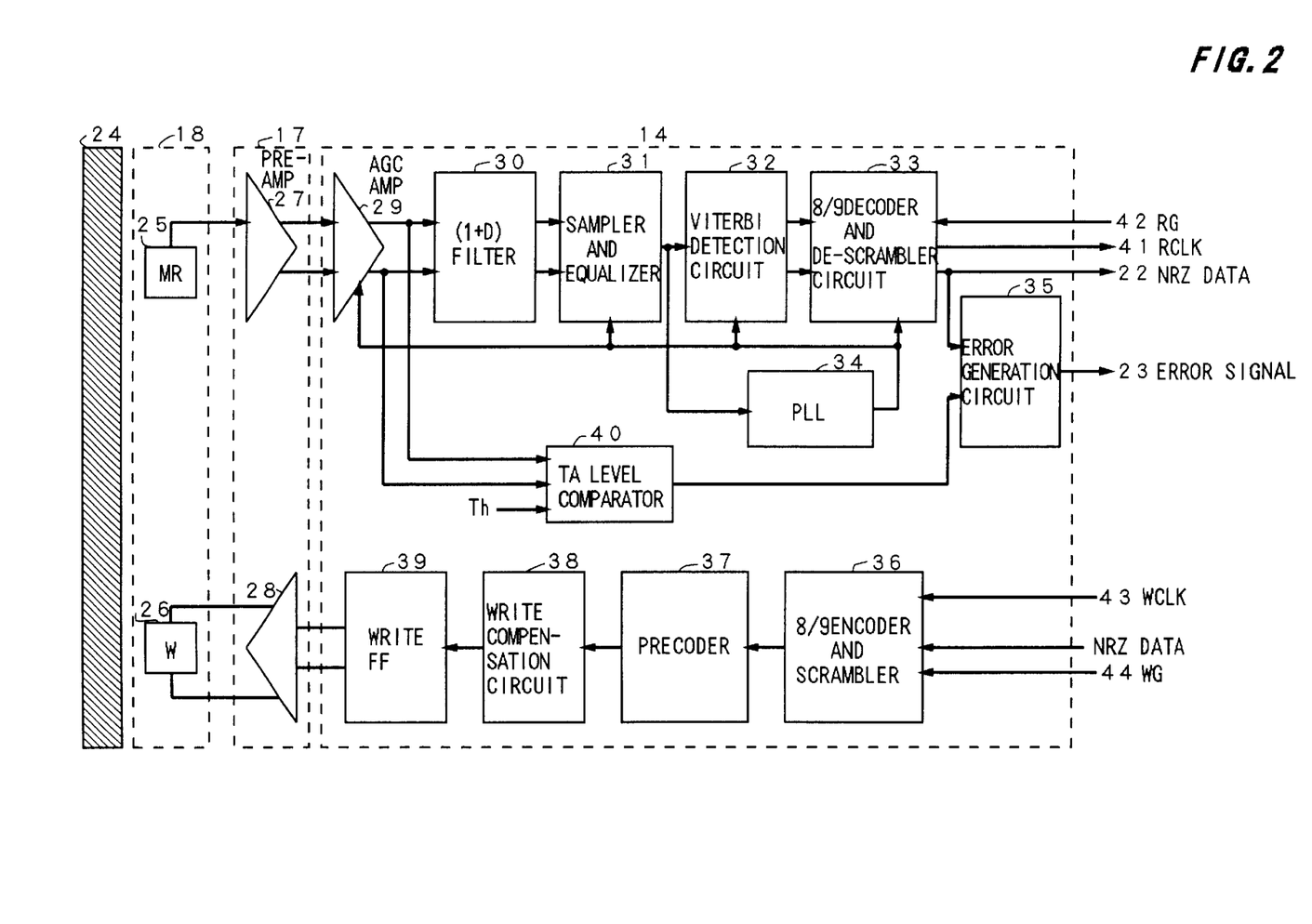
FIG. 2 is a block diagram of an error signal generation circuit of the magnetic disc device shown FIG. 1, for generating an error signal indicative of thermal asperity.

FIG. 2 shows a block diagram of a circuit for generating an error signal when TA has occurred in the magnetic disc device. Blocks in the upper section of the circuit are related to a data reproducing circuit system and blocks in the lower section are related to a data reading circuit system. As shown in FIG. 1, the error signal generation circuit is associated with the magnetic disc (shown by a shaded block in FIG. 2) 24, the read/write head 18, the pre-amplification stage 17, and the read/write controller 14.

The read/write head 18 has an MR head 25 for reading or reproducing information from the magnetic disc 24.

The pre-amplification stage 17 has a preamplifier 27 for amplifying the read data received from the MR head 25.

The read/write controller 14 includes:
- an automatic gain control (AGC) amplifier 29 for controlling the amplitude of a reproduced analogue signal received from the preamplifier 27;
- a (1+D) filter 30;
- a sampler and equalizer 31 for sampling analogue signal received from the (1+D) filter 30 and for correcting waveforms of the signal;
- a Viterbi detection circuit 32 for making correction on the digital read data from the sampler and equalizer 31,
- an 8/9 decoder and de-scrambler circuit 33 for decoding and de-scrambling the data received from the Viterbi detection circuit 32 to generate at its output end a non-return zero (NRZ) data 22;
- a phase locked loop (PLL) 34 for providing read clock RCLK 41 to the AGC amplifier 29, the sampler and equalizer 31, the 8/9 decoder and de-scrambler 33 upon receipt of the digital read data received from the sampler and equalizer 31;
- a thermal asperity level comparator 40 which receives an analogue signal from the AGC amplifier 29 and a predetermined threshold signal Th, and is turned ON to output a signal only when the absolute level of the read data exceeds the threshold;
- an error signal generation circuit 35 for generating an error signal 23 in response to the output signal of the TA level comparator 40 and the NRZ data 22 received from the 8/9 decoder and de-scrambler 33.

A decoding circuit consisting of the (1+D) filter 30, the sampler and equalizer 31, and the Viterbi detection circuit 32 uses a class-4 PRML (partial response maximum likelihood) method, which is known as a procedure for detecting non-trivial data from read data. This PRML method employs a partial response method which can restore desired read data embedded in interfering signals, and a Viterbi decoding method which generates the most likely data from signals disturbed by noise.

The AGC amplifier 29 is a demodulation circuit for amplifying analogue signals received from the preamplifier 27 to a substantially constant level. The AGC amplifier 29 prevents the disturbance in amplitude of the amplified read data if thermal asperity should occur.

The (1+D) filter 30 consists of a low pass filter (LPF) and a booster circuit. The filter 30 receives the reproduced signal from the AGC amplifier 29 and feeds the reproduced signal back to the reproduced signal after it is delayed by 1 bit.

The sampler and equalizer 31 samples analogue signals reproduced from the magnetic disc 24 and casts the sampled data into either 1 or 0 to thereby generating digital read data.

The Viterbi detection circuit 32 performs the Viterbi decoding processing, which is a set of operations to find the most likely bits. The Viterbi detection circuit 32 can generally correct an error if the length the error is a few bit.

The 8/9 decoder and de-scrambler 33 transforms or converts 9 bit data generated by the sampler and equalizer 31 to 8 bit NRZ data and further de-scrambles the data scramblingly processed by the 8/9 encoder and scrambler 36.

Figure 3A:
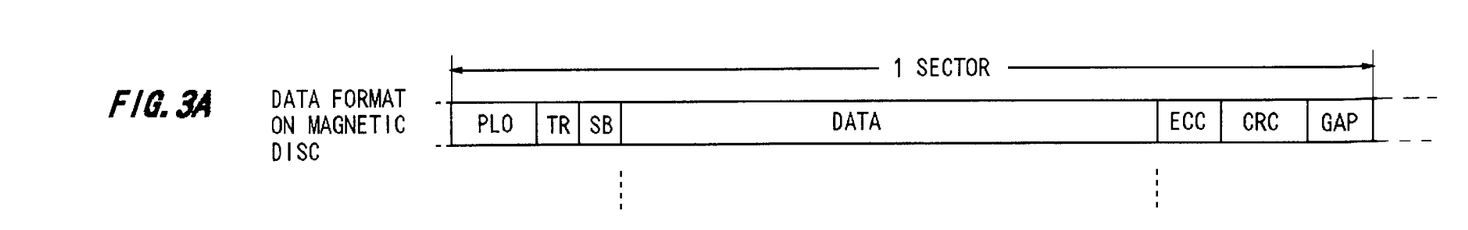

The PLL circuit 34 generates a VCO clock which is in phase with the reproduced data received from the sampler and equalizer 31, and sends the clock signal to the AGC amplifier 29, the sampler and equalizer 31, the Viterbi detection circuit 32 and the 8/9 decoder and de-scrambler 33. The sampler and equalizer 31 uses this VCO clock signal as the sampling clock (which is also referred to as read clock). The 8/9 decoder and de-scrambler 33 uses both the PLL data synchronized with the VCO clock and the read gate signal RG 42 which rises within the sink region (which corresponds to the PLO of the data as shown in FIG. 3A) to decode the reproduced data. The 8/9 decoder and de-scrambler 33 transmits the decoded data as NRZ data to hard disc controller (HDC) 2 in synchronism with the read clock RCLK 41. The read gate signal RG 42 is indicative of the execution of a read operation, so that the read operation is detected when the hard disc controller 2 transmits a read gate signal RG 42.

In addition, in order to prevent asynchronization of the reproduced data with the clock due to thermal asperity, the PLL circuit 34 may temporarily hold synchronization of the data with the clock when thermal asperity has occurred.

Upon receipt of analogue read data from the AGC amplifier 29 and a threshold signal Th, the TA level comparator circuit 40 is turned ON, generating a TA level signal at its output end.

The error signal generation circuit 35 receives the output of the TA level comparator circuit 40 and the NRZ data from 8/9 decoder and de-scrambler 33 and then the error signal generation circuit 35 is activated (to ON state) to feed an error signal 23 to the counter circuit 45 of the hard disc controller (HDC) 2 for a period of time in which thermal asperity is appreciable.

Figure 5A:
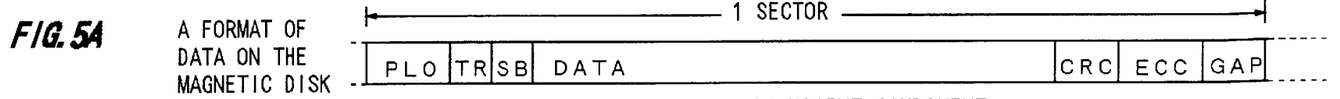
FIG. 5A is a format of data on the magnetic disc.
Figure 5B:
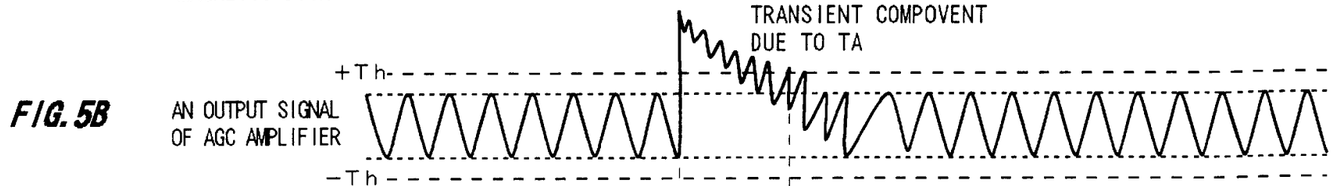
FIG. 5B shows a threshold signal Th and an analogue signal received from AGC amplifier and fed to a TA level comparator, FIG. 5B showing a transient component in the analogue signal subsequent to a TA event.
Figure 5C:
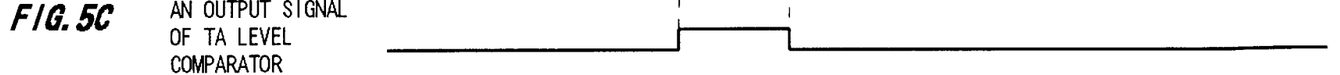
FIG. 5C shows an output signal of the TA level comparator.
Figure 5D:
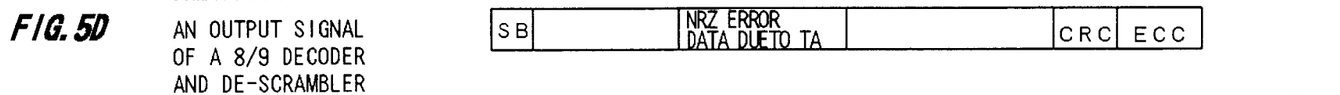
FIG. 5D shows an NRZ data received from a 8/9 decoder and de-scrambler.
Figure 5E:
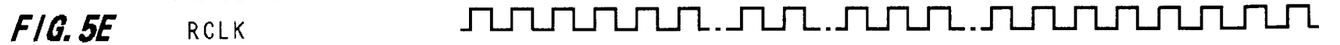
FIG. 5E is a timing chart of read clock RCLK received from a PLL circuit.
Figure 5F:
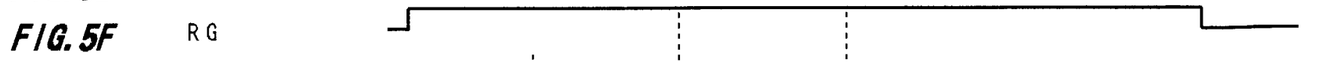
FIG. 5F shows a read gate signal RG.
Figure 5G:
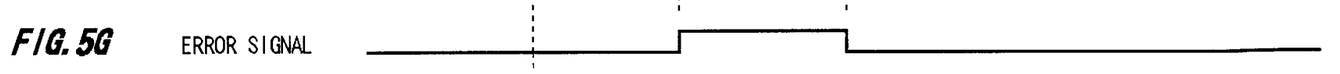
FIG. 5G shows an error signal output from an error signal generation circuit.

In the example shown herein, an error signal 33 as shown in FIG. 5G is generated such that the error signal corresponds to either the signal output from the TA level comparator circuit 40 shown in FIG. 5C, an NRZ data which is partially destroyed due to thermal asperity as shown in FIG. 5D, or a logical sum (OR) of these signals. The error signal 33 thus formed is fed to the counter circuit 45 built in the hard disc controller 2.

Next, operations of the error signal generation circuit in write mode will now be described. In the write mode, the read/write controller 14 incorporates:

an 8/9 encoder and scrambler 36 which receives from a hard disc controller 2 an NRZ data 22, write gate signal WG, and a write clock WCLK to encode and scramble the NRZ data 22;

a precoder 37 for performing 1/(1+D) transformation on the signal received from the 8/9 encoder and scrambler 36;

a write compensation circuit 38 for compensating a write pulse received from the precoder 37, and a write flip flop circuit 39 for receiving signal from the write compensation circuit 38 and for transmitting the signal to a write driver 28 of the pre-amplification stage 17.

In write mode the pre-amplification stage 17 incorporates a The write driver 28 provides an induction type write head 26 of the read/write head 18 with an electric current to write on the magnetic disc 24 data received from the write flip-flop circuit 39.

The 8/9 encoder and the scrambler 36 of the data recording circuit performs an operation which is the inverse of the operation of the 8/9 decoder and de-scrambler 33 in the recording circuit. That is, the 8/9 encoder and the scrambler 36 receives an NRZ data 22 to be written on the magnetic disc 24 from hard disc controller 2, a write gate signal WG and a write clock signal WCLK, and converts the 8 bit write data into 9 bit data and scrambles the 9 bit data.

The precoder 37 performs a 1/(1+D) transformation which is the inverse of the operation performed by the (1+D) filter 30 of the recording circuit.

The write compensation circuit 38 provides write compensation in which the write signal is delayed in write timing in order to compensate slow response of the magnetic disc which cannot keep up with the frequency of the write signal in reading the recorded data. This compensation may be attained by delaying the write timing by an amount of a few percent to several tens of percents. As a result, the write characteristic of the magnetic disc is modified to reduce the bit error rate.

Operation of the Magnetic Disc Device

Referring to FIG. 3, the read operation of the error signal generation circuit 35 associated with TA will now be described.

FIG. 3 shows a data format on the magnetic disc and a timing chart for various signals appearing in the data reproducing circuit: FIG. 3A shows the data format of a data recorded on the magnetic disc 24; FIG. 3B shows the data format of an NRZ data reproduced from the magnetic disc 24; FIG. 3C shows a read clock RCLK; and FIG. 3D shows timing of the read gate signal RG.

The magnetic disc 24 is formatted such that it is divided into a multiplicity of concentric regions (referred to as tracks) which are further divided into a multiplicity of subregions called sectors. Each of such sectors has a data format as shown in FIG. 3A. The sector has a region PLO for drawing in the read clock;

a region TR for adjustment of the equalizer 31;

a Syc Bytes region SB indicating the completion of the drawing in the clock;

a data region DATA having data which was recorded via a write driver 28 on the magnetic disc 24, an error correction code region ECC for detecting and correcting errors in the DATA region;

a cyclic redundancy check region CRC having a check code, belonging to the ID of sector, for use in error detection by the ECC, and a gap region GAP provided between the end of sector and the next sector, which is adapted to absorb such fluctuations as the starting position of write on the disc, the rotational speed of the disc, and the length of the data written in the sector.

Figure 3B:
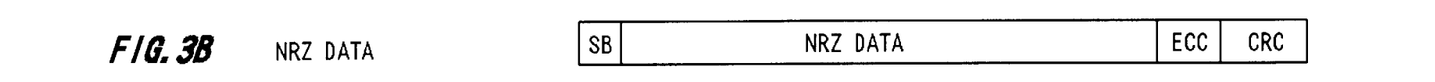
Figure 3C:
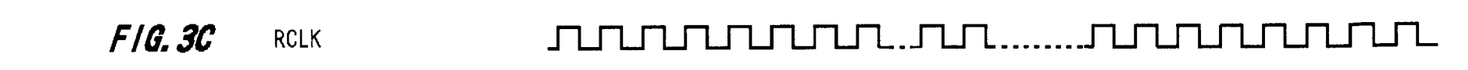
Figure 3D:
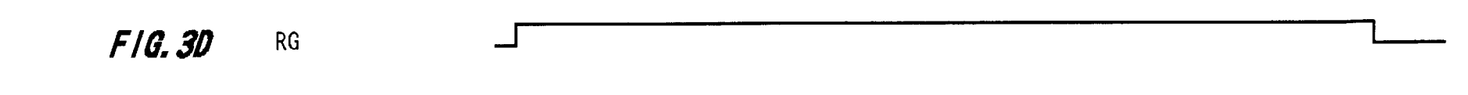

The magnetic disc 24 (FIG. 1) thus formatted and rotating at a constant speed generates signals in the form of varying magnetic field, which are detected by the MR head 25 of the read/write head 18. A signal indicative of data reproduced from the magnetic disc 24 is amplified by the preamplifier 27, with its amplitude adjusted by the AGC amplifier. The amplified analogue signal is then transformed into digital NRZ data 22 as shown in FIG. 3B by a class-4 PRML decoding circuit which consists of the (1+D) filter 30, the sampler and equalizer 31 and the Viterbi detection circuit 32. The digital NRZ data 22 is then fed to the hard disc 2.

In the PLL circuit 34, a read clock RCLK, which is in phase with the output of the sampler and equalizer 31, is generated from the reproduced data output from the sampler and equalizer 31 as shown in FIG. 5C. The read gate signal RG 42 has a rise within the same time domain as the PLO portion (FIG. 3A) for drawing in the clock and falls simultaneously with the NRZ data.

[Error Detection and Correction when TA has Occurred]

Referring now to a flow-chart shown in FIG. 4 and a timing chart for relevant signals shown in FIG. 5, error detection and correction operations of the circuit shown in FIG. 2 executed when a thermal asperity has occurred due to collision of the magnetic head with protrusions on the magnetic disc 24 will be described.

FIG. 4 shows in detail a procedure for locating the erroneous data, finding the length of the error, and determining steps to correct the error.

Figure 5H:
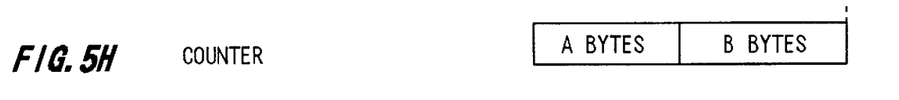
FIG. 5H shows an signal output from a counter circuit.
Figure 6:
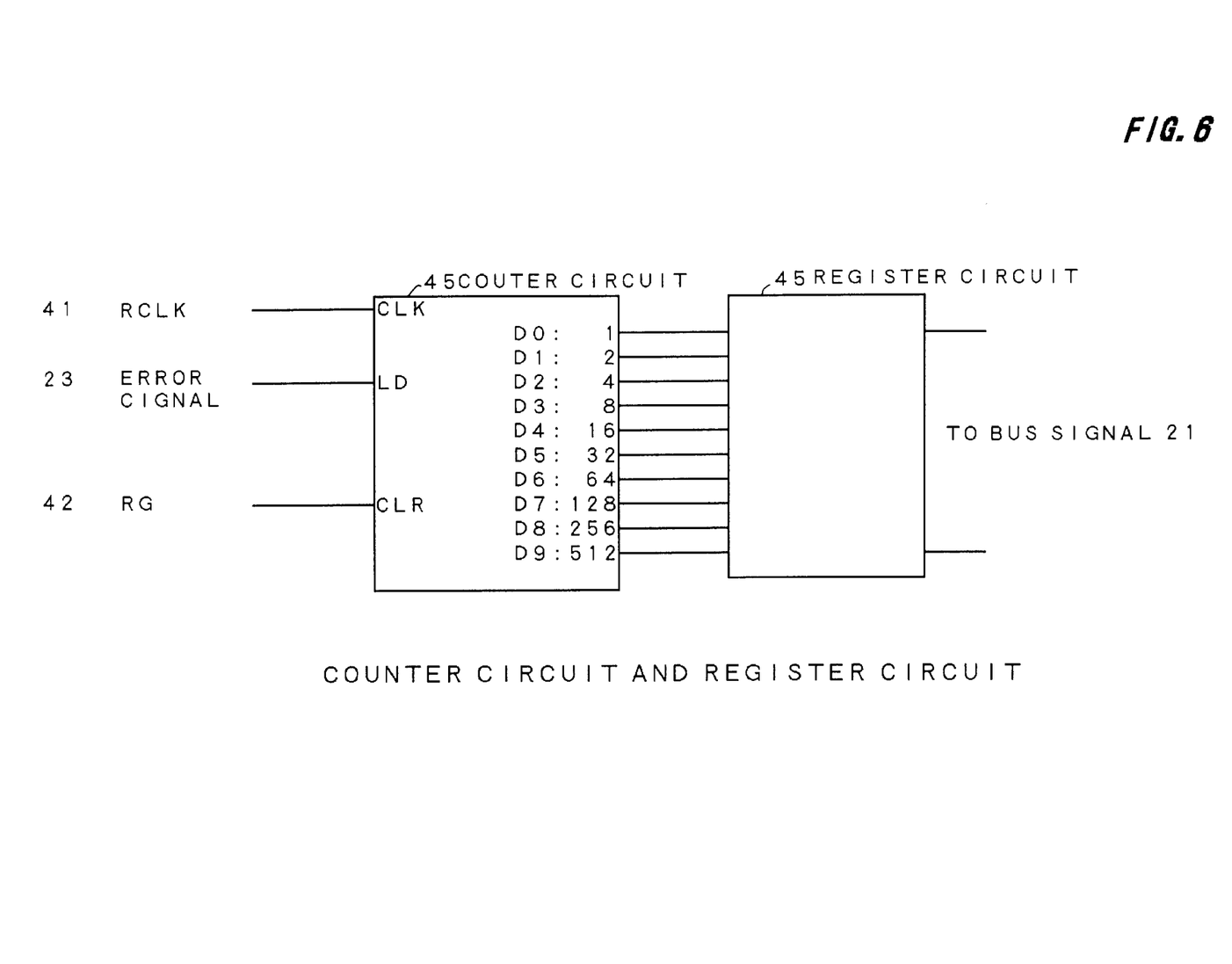
FIG. 6 shows the terminal arrangement of the counter circuit and a register circuit provided in a hard disc controller shown in FIG. 1.

FIGS. 5A–5H show the formats of data and an exemplary waveform that would appear when thermal asperity takes place. The Figures together show how an error associated with thermal asperity can be detected from the waveform. FIG. 5A is the format of data recorded on the magnetic disc 24, which is the same data format as FIG. 3A. FIG. 5B indicates the waveform of the reproduced analogue signal when thermal asperity has occurred. This signal is fed by the AGC amplifier 29 to the TA level comparator circuit 40. It is shown in the Figure that the signal has a transient component due to thermal asperity. The Figure also shows a relationship between the reproduced signal and a threshold signal Th. FIG. 5C shows a signal output from the TA level comparator circuit 40. FIG. 5D shows the same NRZ data 22 output from the 8/9 decoder and de-scrambler 33 as shown in FIG. 3B. FIG. 5E shows a read clock signal RCLK 41 output from the PLL circuit 34, which is the same as the clock signal RCLK shown in FIG. 3C. FIG. 5F shows a read gate signal RG 42 which is the same as the signal RG 42 shown in FIG. 3D. FIG. 5G shows an error signal 23 output from the error signal generation circuit 35. FIG. 5H shows the output of the counter circuit 45 (FIG. 6).

There are two major error correction methods as describe below, which are: (1) Error correction on the fly (referred to as ECC on the fly); and (2) Software error correction (referred to as software ECC). In addition, in order to prevent repeated occurrence of thermal asperity caused by the same protrusion subsequent to an error correction process, a third method (3), known as "automatic sector substitution process", is available, which permits a jump of the head from the sector of the magnetic disc 24 having a protrusion to cause thermal asperity to an alternative sector having no protrusion.

(1) Error Correction On the Fly (ECC on the Fly)

This is a typical error correction method known in the art, in which errors are corrected using a hardware such as an ECC controller 6 shown in FIG. 1. In most magnetic hard disc devices, errors up to 9 bytes or 12 bytes can be corrected on the fly using such error correction circuit, and about 20 bytes of errors can be dealt with using some recent error correction circuit. However, errors exceeding 20 bytes cannot be dealt with by a hardware correction method.

Generally, in correcting errors by means of ECC on the fly method, an error if any in the data is corrected on the fly by the ECC controller 6 while sequentially reading data from the magnetic disc 24. Given that the reproduced data has a length of 2X bytes, it is said that in such error correction the maximum length of errors correctable (correction ability) on the fly is X bytes. That is, errors exceeding X bytes cannot be corrected.

(2) Software ECC

This is a typical software error correction method known in the art, in which errors are corrected using, for example, a software ECC installed in a hard disc controller SH7600 available from CIRRUS LOGIC Corporation and a software ECC installed in a hard disc controller, model ATEC available from Q LOGIC Corporation. This type of software ECC retrieves all the data having length 2X on the magnetic disc 24 and stores the data once in a RAM (not shown) and perform correction thereafter using the software. The correction ability for 2X byte data is 2X.

The software ECC has an advantage that error correction may be performed if the location of the error (i.e. the total length of data from the beginning thereof in unit of sector to the beginning of the error), and the length of the errors themselves are known. On the other hand, it has a disadvantage in that the magnetic head must be idling during the correction procedure, so that read operation is momentarily interrupted, thereby resulting in an overhead.

It should be appreciated that the software ECC of the invention as described below requires a shorter correction time as compared with the above mentioned prior art methods, because the location and the length of erroneous data can be determined beforehand according to the invention in a manner as described below.

(3) Automatic Sector Substitution Process

In a typical initialization of a magnetic disc, a defective sector found in the initialization process is registered as invalid so as to avoid write and read of data in the sector, and a substituting sector is provided for the data that would have been otherwise recorded in the invalid sector. Therefore, the data is read from the substituting sector.

This approach may be used to avoid repeated software ECC error correction for thermal asperity caused by the same protrusion on the magnetic disc. In accordance with the invention defective sectors causing thermal asperity are registered so that they can be automatically substituted for by normal sectors by a firmware, in the same manner as described above for ordinary defective sectors.

The invention utilizes hardware ECC on the fly, software ECC, and an automatic sector substitution process in accordance with the type and/or the size of errors, in combination.

Figure 4A:
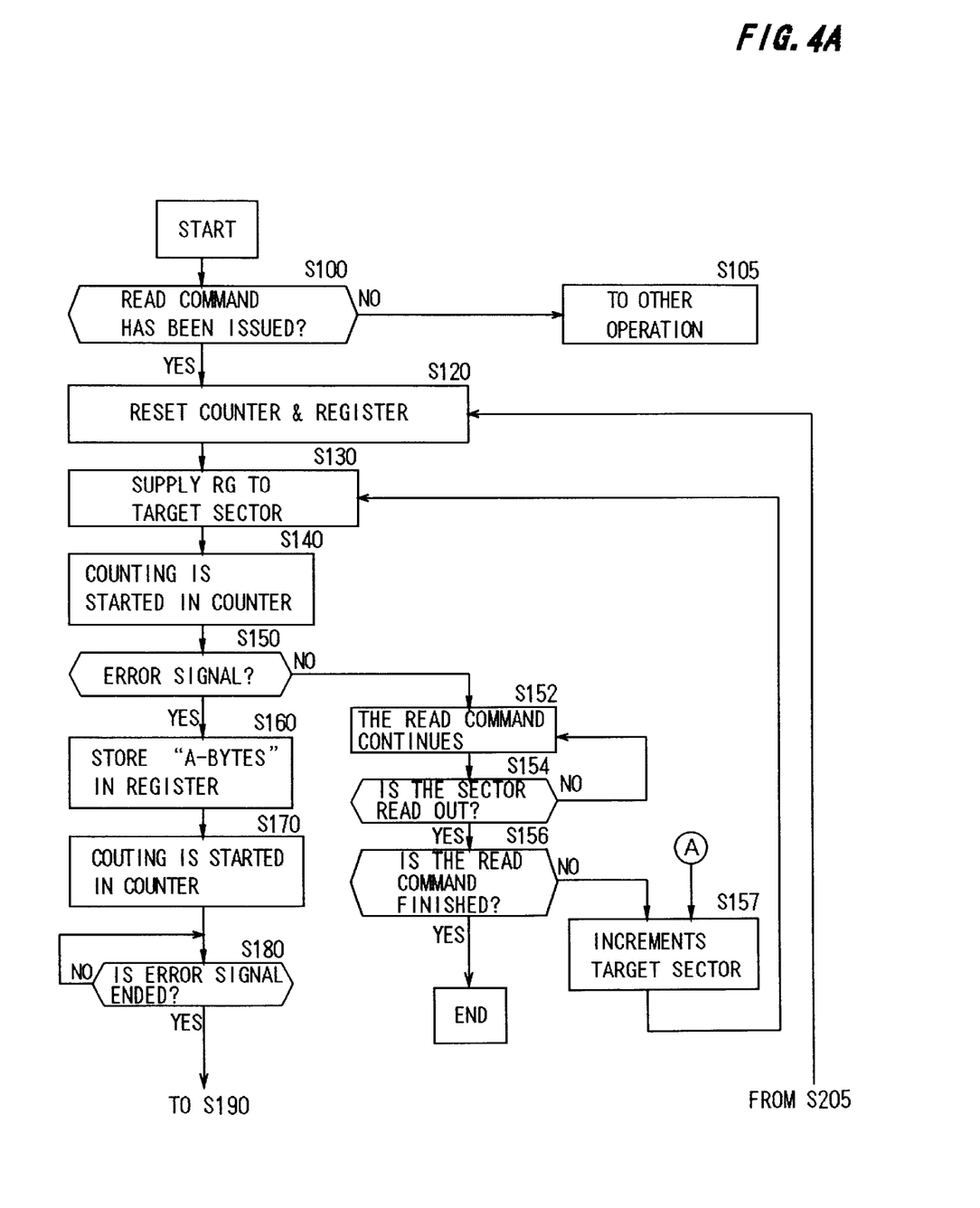
FIGS. 4A–B are a flow-chart showing a procedure for determining the starting location and the length of the erroneous data, and determining which of the error correction means be used.
Figure 4B:
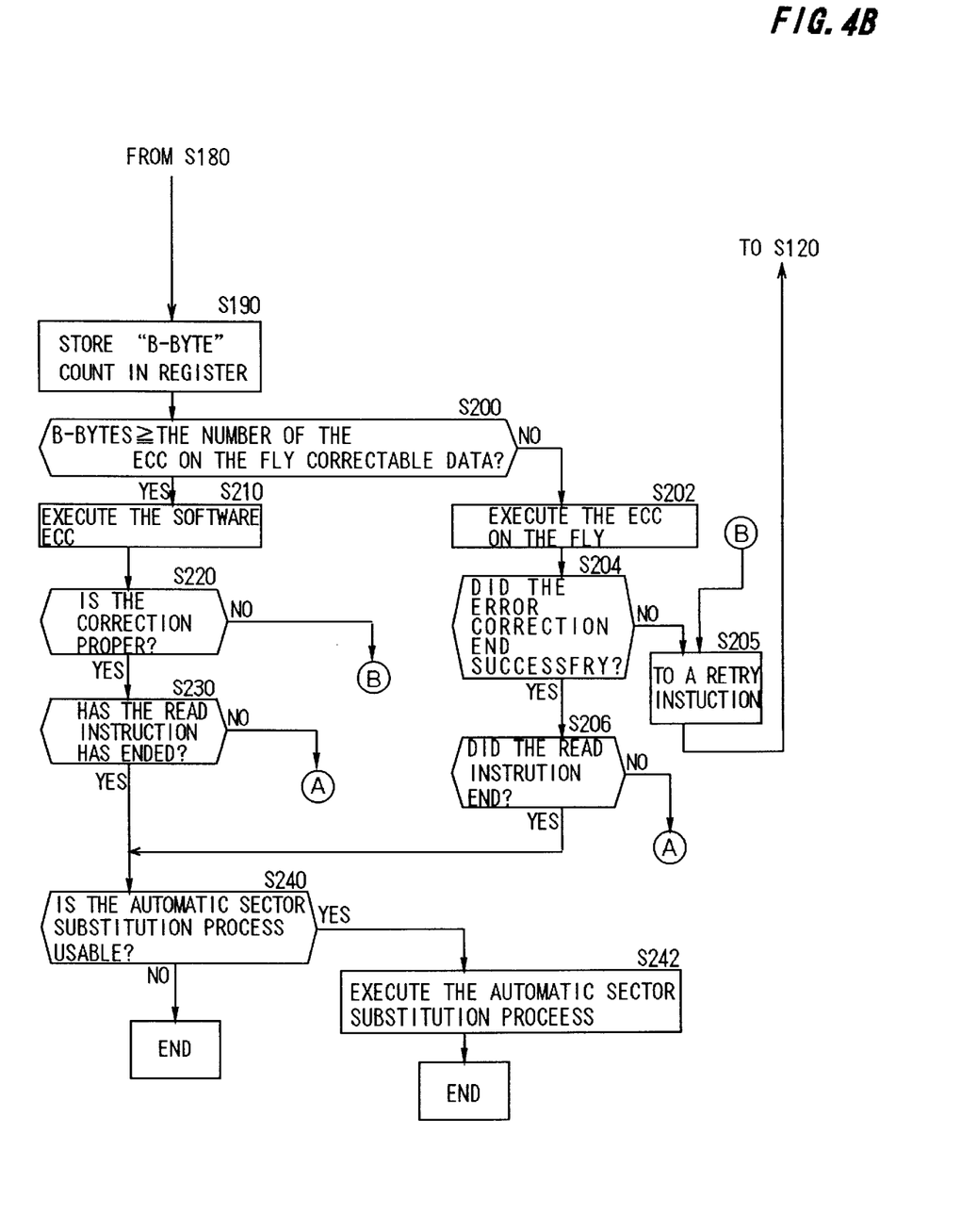

As shown in FIGS. 4A–B, the correction procedure of the invention begins with step 100 in which the CPU 8 makes a query to the host computer (not shown) via the interface 1 if the host computer has been issued a read command. If the answer is NO, the procedure proceeds to Step S105 where operations irrelevant to error correction are carried out, but otherwise the procedure proceeds to Step S120.

In Step S120, the error counter circuit 45 and the register circuit 46 (FIG. 3) are reset to the respective initial values. The procedure goes to Step S130.

The counter circuit 45 and the register circuit 46 as shown in FIG. 6 are provided in the hard disc controller 2 of FIG. 1, preferably in the disc format controller 3. The counter circuit 45 receives read clock RCLK 41 at terminal CLK, an error signal 23 from the error signal generation circuit 35 of the read/write controller 14 (FIG. 2) at terminal LD, and read gate signal RG 42 at terminal CLR. The read gate signal RG 42 is cut off (FIG. 3C) when all the data associated with one sector has been read, and accordingly the counter circuit 45 and the register circuit 46 are reset. The procedure then goes to Step S130.

In Step S130, a read gate signal RG 42 is supplied to read the next data sector (which is referred to as target sector).

In the next Step S140, the counter circuit 45 starts counting the number of sectors read out (FIGS. 5D and 5H), until the sector having errors due to thermal asperity is found, so as to find the location of the erroneous sector in the subsequent steps.

The procedure then proceeds to Step S150, where the CPU 8 makes a query whether an error signal 23 has been generated. If the answer is NO, the procedure proceeds to Step S152, but goes to Step S160 if the error has been detected.

In step S152, the CPU 8 continues to execute the read command as instructed by the host computer (not shown), asking whether all the data in the target sector has been read out (Step S154). When all the data has been read out, the procedure goes to Step S156, where a query is made as to whether the read command is finished. If it is finished, the procedure proceeds to Step S157, but otherwise the procedure is ended.

In Step S157, the CPU 8 increments the sector number for the target sector. That is, the target sector is set to next data sector, and loops back to Step 130 to repeat the read operation for the next target sector.

Coming back to Step S150, when an error signal is detected, an error correction process is started in the next Step 160. The error signal may be generated in the first method as follows and applied in Step 160. In this method error signal 23 is generated by the error signal generation circuit 35 in collaboration with the TA level comparator circuit 40 when thermal asperity has occurred. In an event when thermal asperity has occurred, the reproduced data, output from the AGC amplifier 29, contains a transient signal having a waveform as shown in FIG. 5B. The reproduced data is fed to the TA level comparator circuit 40 (FIG. 2) together with the predetermined threshold signal Th. The TA level comparator circuit 40 is adapted to compare the absolute value of the reproduced data with the absolute value of the threshold signal Th and generate an ON signal only if the former value exceeds the latter value, as shown in FIGS. 5B and 5C. The ON signal generated by the TA level comparator is fed to the error signal generation circuit 35.

From the number of the bytes in the sector as counted up in Step S140, the CPU 8 obtains the length of non-erroneous data in byte, "A-bytes", indicating also the location of the erroneous data. The value of the A-bytes is stored in the register circuit 46 (FIG. 3) in Step S160. The A-bytes representing the location of the erroneous sector is determined from the number of the read clock signals RCLK 41 shown in FIG. 5E counted for the period of time during which the read gate signal RG is ON to read data from the magnetic disc 24 as shown in FIG. 5F and until the error signal 23 shown in FIG. 5G occurs.

The value of the A-bytes is fed to the register circuit 46 for temporary storage thereof. The register circuit 46 transmits the value of A-bytes to CPU 8 for use as a bus control signal 21. The procedure then proceeds to the next step S170.

In step S170, counting of the length the erroneous data itself is started using the counter circuit 45.

In the next step S180, CPU 8 makes a query as to whether or not the error signal (FIG. 5G) has ended. If the error signal has ended, the procedure proceeds to step S190 for the next process, but otherwise the procedure loops back to itself making the same query.

The error signal 33 shown in FIG. 5G is generated to indicate the length of the erroneous data. This error signal can be generated by the error signal generation circuit 35 by selecting one of the three signals: (a) signal output from the TA level comparator circuit 40 shown in FIG. 5C; (2) NRZ data including errors due to thermal asperity; and (3) signal indicative of the logical sum (OR) of these two signals. The error signal 33 is in phase with the reference clock RCLK, and is fed by the error signal generation circuit 35 to the counter circuit 45 built in the hard disc controller (HDC) 2. The counter circuit 45 counts up the read clock 41 during ON period of the error signal 33, yielding B-bytes for the length of the erroneous data as shown in FIG. 5H.

In Step S190, CPU 8 causes the register circuit 46 (FIG. 6) to store the value of B-bytes indicative of the erroneous data as counted in step S170. The register circuit 46 then transmits this value to CPU 8 for use as a bus signal 21.

In the next step S200, CPU 8 makes a determination whether the length of the B-bytes stored in the register circuit 46 (FIG. 3) in step S190 is longer than the length of data correctable by the ECC on the fly. If so, the procedure proceeds to Step S210, but otherwise proceeds to Step S202.

In Step S202, CPU 8 activates the ECC controller 6 (FIG. 1) to execute the ECC on the fly and goes to step S204.

In Step S204, CPU 8 makes a determination if the error correction process has ended successfully. If so, the procedure goes to Step S205, or otherwise goes to Step S206.

In Step S205, CPU 8 provides a retry instruction to read again a sector to be error-corrected, so that the procedure loops back to step S120 to go over the correction process. If the software ECC fails to remove errors after a predetermined number of retries, the CPU 8 displays a message to the operator that there is(are) error(s) not correctable in the data.

In Step S206, it is determined if the read instruction from the host computer has ended. If it is not, the procedure loops back to Step S157 for shifting the target sector to the next data sector. If the read instruction has ended, the procedure goes to step S240.

Coming back to Step S210, CPU 8 executes the software ECC, since the errors cannot be corrected by the ECC on the fly due to the fact that the length of the current erroneous data, B-byte, is longer than the length of errors that can be corrected by the ECC on the fly. Then the procedure goes to the next Step S220.

In step S220, a determination is made if the correction of the errors done in step S210 is proper. If it is found that the correction is improper, the procedure goes back to Step S205, where read operation is retried. On the other hand, if the correction is proper, the procedure proceeds to Step S230.

In Step S230, CPU 8 makes a query if the read instruction from the host computer has ended. If the answer is NO, then the procedure loops back to Step S157. If the answer is YES, then Step S240 follows.

In step S240, in order to prevent repetitive thermal asperity caused by the same protrusion on the magnetic disc 24, a determination is made if the automatic sector substitution process is usable or not. If the automatic sector substitution process is usable, Step S242 follows. Otherwise, the procedure is ended.

In Step S242, the procedure provides a process in which a substituting sector is established on the magnetic disc 24 for the defective sector(s). The procedure is then ended.

The ECC on the fly, the software ECC, and the automatic sector substitution process may be employed in combination as described above in correcting erroneous data on the magnetic disc. Next, a round off procedure and a second error signal generation method for correcting multiple errors will now be described below.

[Round Off Procedure]

Figures 7A, 7B:
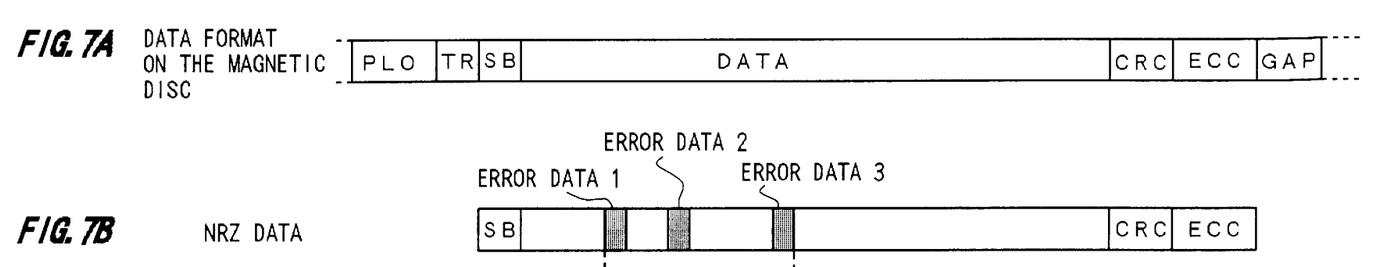
FIG. 7A shows the format of data on the magnetic disc.
FIG. 7B shows an NRZ data section of the reproduced data containing a multiplicity of errors.
Figures 7C, 7D:
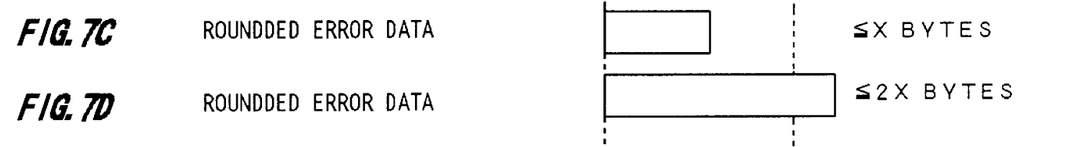
FIG. 7C shows rounding up of two errors 1 and 2 of FIG. 7B.
FIG. 7D shows rounding up of three errors 1, 2, and 3 shown in FIG. 7B.
Figure 7E:
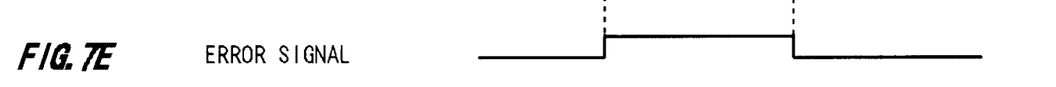
FIG. 7E indicates an error signal.

FIGS. 7A–7E together show a scheme in which a multiplicity of errors occurring in one sector may be detected using a round off procedure which rounds off multiple errors within a length of bytes correctable by the hardware ECC on the fly or the software ECC. FIG. 7A shows a data format on the magnetic disc 24. FIG. 7B shows NRZ data portion of the data shown in FIG. 7A in a case where the data includes therein multiple errors (such as errors 1, 2, and 3 in the example shown in FIG. 7B). FIG. 7C shows data obtained by rounding off the erroneous data 1 and 2. FIG. 7D shows data obtained by rounding off the erroneous data 1 and 2, and 3. FIG. 7E shows the error signal of FIG. 5G.

When the erroneous data 1 and 2 are the only erroneous data in the DATE sector, and if the rounded erroneous data therefor is smaller in byte than the maximum bytes, 9 bytes say, correctable by the hardware ECC as shown in FIG. 7C, these errors may be corrected by the hardware ECC on the fly, as described above.

If, on the other hand, a further erroneous data 3 exists in the sector such that the rounded erroneous data has a data length greater than the maximum correctable bytes by the hardware ECC on the fly, then the errors can be corrected by the software ECC as described previously, provided that the rounded erroneous data is smaller in size than the maximum data length correctable by the software ECC method. In any event, the errors may be corrected appropriately by one of the two correction methods selected in accordance with the invention.

[Alternative Method of Generating Error Signal]

In the first error signal generation method described above, the error signal 23 is generated by the error signal generation circuit 35 upon receipt of signals from the TA level comparator circuit 40 and from the 8/9 decoder and de-scrambler 33, as described in connection with FIG. 2. An alternative error signal may be generated by a second method as shown in FIG. 8, which is based on the digital nature of the decoded NRZ data.

Figure 8A:
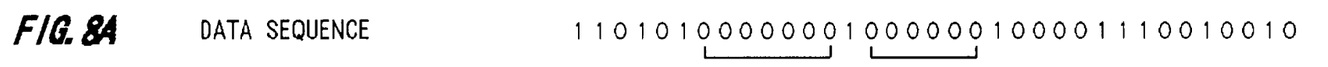
FIG. 8A is an example of data sequence having 8/9 (0, 4/4) format.
Figure 8B:
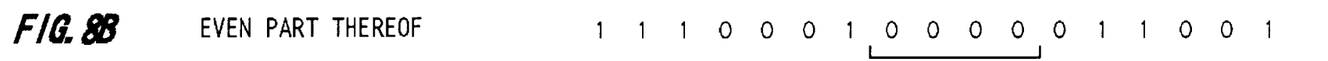
FIG. 8B shows an even part of the sequence shown in FIG. 8A.
Figure 8C:
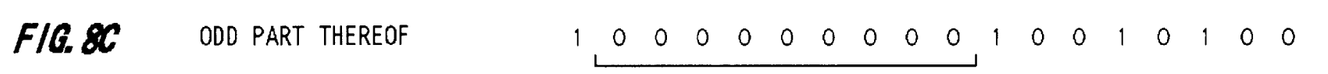
FIG. 8C shows an odd part of the data shown in FIG. 8A.
Figures 8D, 8E:
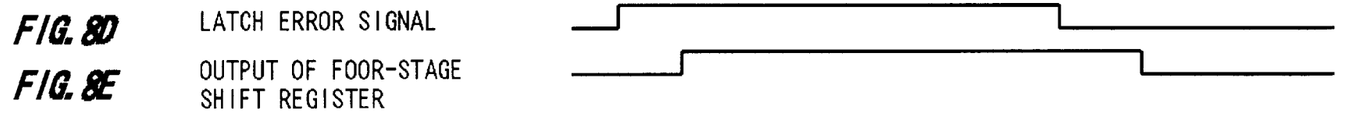
FIG. 8D shows a latch error signal.
FIG. 8E shows an output of a four-stage shift register.

FIG. 8A illustrates a sequence of bits representing the reproduced data having 8/9 (0, 4/4) format. FIG. 8B shows the even part of the sequence shown in FIG. 8A (i.e. the sequence of bits of even order in the original sequence), while FIG. 8C the odd part of the sequence of FIG. 8A. FIG. 8D shows a latch error signal and FIG. 8E an output of a 4-stage shift register.

The 8/9 decoder and de-scrambler 33 shown in FIG. 2 employs a 8/9 transform coding wherein an 8/9 (0, n/m) transformation format is generally used. This transformation format is based on "n/m run-length rules" in which the number of zeros between two neighboring "1"s is not more than n and the number of "0"s in the even and the odd parts of the digital data is not more than m (zero rules).

Accordingly, in the case of 8/9 (0, 4/4) encoding format for example, a correct data sequence includes at most 4 consecutive zeros, and the even and the odd parts the data each also include at most 4 consecutive zeros. As an another example, data encoded by 8/9 (0, 3/5) encoding format has at most 3 consecutive zeros and each of the odd and the even parts thereof includes at most 5 consecutive zeros.

To be specific, suppose that a digital data has a sequence of "1101010000000100000010000111001001001001", as shown in FIG. 8A. The even part of the sequence is "11100010000011001" as shown in FIG. 8B, and the odd part is "100000000010010100" as shown in FIG. 8C. Applying the zero rules to the data sequence, the maximum number of consecutive zeros in the data as well as in the even and odd parts thereof must be equal to or less than 4. However, in actuality the data shown in FIG. 8A contains two underlined sections having 7 zeros and 6 zeros, respectively, which are against the zero rules imposed on the data. The even part and the odd part contains a section having 5 consecutive zeros and a section having 9 consecutive zeros, respectively. These zeros may be detected when the data fails to converge even after the data is passed through a 4-stage shift register (not shown) with "0" latched.

Consequently, if a latch error signal is defined associated with the portions of the data which are not in accord with the zero-rules, one may obtain a 24-byte error signal 23 as shown in FIG. 8D in the case shown herein. FIG. 8E shows a latch error signal obtained from this data through the 4-stage shift register.

In place of a combination of the TA level comparator circuit 40 and the error signal generation circuit 35 for generating an error signal, it is possible to provide a hardware error detection means for generating such error signal 23 for a decoded NRZ digital data, based on the zero-rules as defined by 8/9 (0, n/m) format.

It would be apparent to those skilled in the art that either one of the first and the second error signal generation methods as described above may be arbitrarily chosen. It is also possible to employ the two methods simultaneously to generate two kinds of error signals and choose either one of them using an appropriate selector circuit (not shown).

Advantages observed in the embodiments are as follows.

(1) In one embodiment of the invention, erroneous data caused by thermal asperity may be located.

(2) In another embodiment of the invention, the length of the errors itself may be determined.

(3) In still another embodiment of the invention, an error signal may be generated by a combination of a comparator and an error signal generation circuit, as well as by a run length rules imposed on the data.

(4) In a further embodiment of the invention, a software ECC may be executed even in a case where hardware ECC on the fly is inapplicable, based on the fact that both the location of errors, caused by thermal asperity for example, and the length of the errors may be determined.

(5) In a still further embodiment of the invention, since the precise location and the length of erroneous data due to thermal asperity can be determined from an error signal, the data sector associated with the erroneous data may be registered as an invalid sector and may be substituted for by a new sector defined for the invalid sector.

(6) The invention thus provides an improvement in error correction ability of a magnetic disc device, thereby reducing the error rate and enhancing the reliability thereof.

[Advantages of the Invention]

The invention provide a data correction device which may determine the location and the length of the error contained in the data read from a magnetic recording medium.

The invention provides a method which may determine the location and the length of the error contained in the data read from a magnetic recording medium.

The invention provides a magnetic disc device which is equipped with means for detecting erroneous data caused by thermal asperity due to a sudden change in electric resistance of an MR element of an MR head caused by a temporary collision of the head with the magnetic disc.

The invention provides a magnetic disc device which is equipped with means for detecting and correcting erroneous data due to thermal asperity.

The invention provides a method for detecting erroneous data for use with a magnetic disc device.

The invention provides a method for detecting and correcting erroneous data for use with a magnetic disc device.

The invention further provides a magnetic disc device equipped with means for detecting an error in the data read from a magnetic disc caused by thermal asperity a sudden change in electric resistance of an MR element of an MR head caused by a temporary collision of the MR head with the magnetic disc.

The invention further provides a magnetic disc device equipped with means for detecting and correcting errors caused by thermal asperity and contained in the data read from the magnetic disc.

[Other Embodiments]

The present invention may be realized as the following embodiments, corresponding to the respective claims.

(1) The erroneous data correction device according to claim 14, wherein said decoder performs 8/9 format transformation.

(2) The erroneous data correction device according to claim 14, wherein said given set of run length rules is in accord with 8/9 (0, n/m) zero run length format.

(3) The erroneous data correction device according to claim 14, wherein said zero run-length rules is in accord with 8/9 (0, 4/4) zero run length format.

(4) The erroneous data correction device according to claim 14, wherein said zero run-length rules is in accord with 8/9 (0, 3/5) zero run length format.

(5) A magnetic disc recording device, comprising an erroneous data correction device according to any one of claim 1 through claim 15.

(6) The magnetic disc device according to claim 15, wherein said magnetic recording medium is a magnetic disc.

(7) The error correction method according to claim 20, further comprising a step of determining the length of said erroneous data based on said error signal.

(8) The error correction method according to claim 21, further comprising an automatic sector substitution process to be executed subsequent to said software ECC.

What is claimed is:

1. An erroneous data correction device, comprising:
   a comparator which compares a data signal indicative of data read from a magnetic recording medium and input thereto with a threshold signal having a predetermined threshold level input thereto, for generating an output when the level of said data signal exceeds the level of said threshold signal;
   an error signal generation circuit for generating an error signal using the output of said comparator and said data signal;
   hardware means for executing a hardware ECC on-the-fly on erroneous data of the data read from the magnetic recording medium; and
   software means for executing a software ECC on said erroneous data, when a length of said erroneous data can not be corrected by said hardware means;
   means for determining a location of said erroneous data included in said data signal; and
   means for providing a substitute region for writing and reading of corrected data in an area of said magnetic recording medium, except said location of said erroneous data, after said erroneous data is corrected by said hardware means or said software means.

2. The erroneous data correction device according to claim 1, further including means for determining the location of said erroneous data included in said data signal, using said error signal.

3. The erroneous data correction device according to claim 1, wherein said data signal includes a transient waveform generated by thermal asperity causing errors in the data signal.

4. The erroneous data correction device according to claim to claim 1, wherein said comparator circuit generates said output when the absolute level of said data signal exceeds the absolute level of said threshold signal.

5. The erroneous data correction device according to claim 1, wherein said error signal generation circuit selects either one of said data signal or the output of said comparator circuit and transmits said selected one as the error signal of said error signal generation circuit.

6. The erroneous data correction device according to claim 1, wherein said error signal generation circuit outputs an error signal which is the logical sum of the output of said comparator circuit and said data signal.

7. The erroneous data correction device according to claim 1, further comprising
   a counter circuit for receiving said error signal and a read clock, and for counting up said read clock from the beginning of said data signal so as to locate erroneous data that exists in said data signal.

8. The erroneous data correction device according to claim 7, further comprising
   a register circuit connected with said counter circuit.

9. The erroneous data correction device according to claim 1, wherein the location of an erroneous data is given in terms of bytes as counted from the beginning of the sector associated with said read data.

10. The erroneous data correction device according to claim 1, adapted to determine the length of said erroneous data included in said data read from said magnetic recording medium based on said error signal.

11. The erroneous data correction device according to claim 10, further comprising
    a counter circuit for receiving said error signal and read clock signal, to count said clock signal over a period of the error signal so as to determine the length of said erroneous data.

12. The erroneous data correction device according to claim 11, further comprising
    a register circuit connected with said counter circuit.

13. The erroneous data correction device according to claim 11, wherein said length of said erroneous data is given in terms of bytes as counted from a beginning of a sector associated with said read data.

14. An error correction method, comprising steps of:
    comparing a data signal reproduced from a magnetic disc with a predetermined threshold signal to generate an output signal when the level of said data signal exceeds the level of said threshold signal;
    generating an error signal associated with erroneous data included in said data signal based on said output signal and said data signal;
    determining a location of said erroneous data based on said error signal;
    correcting said erroneous data by executing a hardware ECC on-the-fly, when a length of said erroneous data can be corrected by said hardware ECC on-the-fly and correcting said erroneous data by executing a software ECC when due to said length of said erroneous data, said erroneous data can not be corrected by said hardware ECC on-the-fly; and
    providing a substitute region for writing and reading of corrected data in an area of said magnetic disk, except said location of said erroneous data.

* * * * *